US010421476B2

(12) United States Patent
Rouleau (10) Patent No.: US 10,421,476 B2
(45) Date of Patent: Sep. 24, 2019

(54) SELF-LOCKING TELESCOPE ACTUATOR OF A STEERING COLUMN ASSEMBLY

(71) Applicant: Steering Solutions IP Holding Corporation, Saginaw, MI (US)

(72) Inventor: James E. Rouleau, Burt, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 57 days.

(21) Appl. No.: 15/628,836

(22) Filed: Jun. 21, 2017

(65) Prior Publication Data

US 2017/0361863 A1  Dec. 21, 2017

Related U.S. Application Data

(60) Provisional application No. 62/352,809, filed on Jun. 21, 2016.

(51) Int. Cl.
| B62D 1/184 | (2006.01) |
| B62D 1/185 | (2006.01) |
| B62D 1/181 | (2006.01) |
| B62D 1/19  | (2006.01) |

(52) U.S. Cl.
CPC ............. *B62D 1/184* (2013.01); *B62D 1/181* (2013.01); *B62D 1/185* (2013.01); *B62D 1/192* (2013.01); *B62D 1/195* (2013.01)

(58) Field of Classification Search
CPC ........ B62D 1/181; B62D 1/184; B62D 1/185; B62D 1/187; B62D 1/192; B62D 1/195
See application file for complete search history.

(56) References Cited

U.S. PATENT DOCUMENTS

| 1,795,567 A | 3/1931 | Maurice |
| 3,386,309 A | 6/1968 | Reed et al. |
| 3,396,600 A | 8/1968 | Zeigler et al. |
| 3,782,492 A | 1/1974 | Hollins |
| 4,138,167 A | 2/1979 | Ernst et al. |

(Continued)

FOREIGN PATENT DOCUMENTS

| CN | 1449952 A | 10/2003 |
| CN | 1550395 A | 12/2004 |

(Continued)

OTHER PUBLICATIONS

China Patent Application No. 201510204221.5 Second Office Action dated Mar. 10, 2017, 8 pages.

(Continued)

*Primary Examiner* — Laura Freedman (57) ABSTRACT

An extendable steering column assembly includes a steering shaft, an energy absorption device, and a self-locking telescope actuator. The steering shaft is configured to rotate about an axis, and includes a forward shaft portion mounted for rotation to a fixed support structure, and a rearward shaft portion mounted for rotation to a jacket. The rearward shaft portion is configured to axially translate with the jacket. The energy absorption device is engaged to the jacket. The telescope actuator includes a rod extending along a centerline, a nut threaded to the rod, and a casing in operable contact with the nut. Rotational motion along with axial translational motion is induced between the rod and the nut when at least in at least a power state.

20 Claims, 9 Drawing Sheets

(56) References Cited

U.S. PATENT DOCUMENTS

| | | | |
|---|---|---|---|
| 4,315,117 A | 2/1982 | Kokubo et al. | |
| 4,337,967 A | 7/1982 | Yoshida et al. | |
| 4,476,954 A | 10/1984 | Johnson et al. | |
| 4,503,300 A | 3/1985 | Lane, Jr. | |
| 4,503,504 A | 3/1985 | Suzumura et al. | |
| 4,559,816 A | 12/1985 | Ebert et al. | |
| 4,561,323 A | 12/1985 | Stromberg | |
| 4,598,604 A | 7/1986 | Sorsche et al. | |
| 4,602,520 A * | 7/1986 | Nishikawa | B62D 1/181 280/775 |
| 4,633,732 A | 1/1987 | Nishikawa et al. | |
| 4,661,752 A * | 4/1987 | Nishikawa | B62D 1/181 307/10.1 |
| 4,669,325 A * | 6/1987 | Nishikawa | B62D 1/181 384/252 |
| 4,691,587 A | 9/1987 | Farrand et al. | |
| 4,785,684 A * | 11/1988 | Nishikawa | B62D 1/181 280/775 |
| 4,836,566 A | 6/1989 | Birsching | |
| 4,881,020 A | 11/1989 | Hida et al. | |
| 4,893,518 A * | 1/1990 | Matsumoto | B62D 1/181 280/775 |
| 4,901,544 A | 2/1990 | Jang | |
| 4,901,593 A * | 2/1990 | Ishikawa | B62D 1/181 280/775 |
| 4,921,066 A | 5/1990 | Conley | |
| 4,941,679 A | 7/1990 | Baumann et al. | |
| 4,962,570 A | 10/1990 | Hosaka et al. | |
| 4,967,618 A | 11/1990 | Matsumoto et al. | |
| 4,976,239 A | 12/1990 | Hosaka | |
| 5,048,364 A | 9/1991 | Minamoto et al. | |
| 5,240,284 A | 8/1993 | Takada et al. | |
| 5,295,712 A | 3/1994 | Omura | |
| 5,319,803 A | 6/1994 | Allen | |
| 5,488,555 A | 1/1996 | Asgari et al. | |
| 5,590,565 A | 1/1997 | Palfenier et al. | |
| 5,613,404 A | 3/1997 | Lykken et al. | |
| 5,618,058 A | 4/1997 | Byon | |
| 5,668,721 A | 9/1997 | Chandy | |
| 5,690,362 A | 11/1997 | Peitsmeier et al. | |
| 5,737,971 A | 4/1998 | Riefe et al. | |
| 5,765,116 A | 6/1998 | Wilson-Jones et al. | |
| 5,813,699 A | 9/1998 | Donner et al. | |
| 5,890,397 A | 4/1999 | Stoner et al. | |
| 5,893,580 A | 4/1999 | Hoagland et al. | |
| 5,911,789 A | 6/1999 | Keipert et al. | |
| 5,931,250 A | 8/1999 | Kagawa et al. | |
| 5,941,130 A | 8/1999 | Olgren et al. | |
| 6,041,677 A | 3/2000 | Reh et al. | |
| 6,070,686 A | 6/2000 | Pollmann | |
| 6,079,513 A | 6/2000 | Nishizaki et al. | |
| 6,142,523 A * | 11/2000 | Bathis | B62D 1/181 280/777 |
| 6,170,862 B1 | 1/2001 | Hoagland et al. | |
| 6,220,630 B1 | 4/2001 | Sundholm et al. | |
| 6,227,571 B1 | 5/2001 | Sheng et al. | |
| 6,234,040 B1 | 5/2001 | Weber et al. | |
| 6,264,239 B1 * | 7/2001 | Link | B62D 1/181 280/775 |
| 6,301,534 B1 | 10/2001 | McDermott, Jr. et al. | |
| 6,354,622 B1 | 3/2002 | Ulbrich et al. | |
| 6,354,626 B1 | 3/2002 | Cartwright | |
| 6,360,149 B1 | 3/2002 | Kwon et al. | |
| 6,373,472 B1 | 4/2002 | Palalau et al. | |
| 6,381,526 B1 | 4/2002 | Higashi et al. | |
| 6,390,505 B1 | 5/2002 | Wilson | |
| 6,460,427 B1 | 10/2002 | Hedderly | |
| 6,571,587 B2 | 6/2003 | Dimig et al. | |
| 6,578,449 B1 | 6/2003 | Anspaugh et al. | |
| 6,612,198 B2 * | 9/2003 | Rouleau | B62D 1/181 280/775 |
| 6,612,393 B2 | 9/2003 | Bohner et al. | |
| 6,819,990 B2 | 11/2004 | Ichinose | |
| 7,021,416 B2 | 4/2006 | Kapaan et al. | |
| 7,025,380 B2 * | 4/2006 | Arihara | B62D 1/181 280/775 |
| 7,048,305 B2 | 5/2006 | Muller | |
| 7,062,365 B1 | 6/2006 | Fei | |
| 7,140,213 B2 | 11/2006 | Feucht et al. | |
| 7,159,904 B2 * | 1/2007 | Schafer | B62D 1/181 280/775 |
| 7,213,842 B2 | 5/2007 | Uehle et al. | |
| 7,258,365 B2 * | 8/2007 | Kahlenberg | B62D 1/181 280/775 |
| 7,261,014 B2 | 8/2007 | Arihara | |
| 7,290,800 B2 | 11/2007 | Schwarzbich et al. | |
| 7,295,904 B2 | 11/2007 | Kanevsky et al. | |
| 7,308,964 B2 | 12/2007 | Hara et al. | |
| 7,410,190 B2 * | 8/2008 | Sawada | B62D 1/19 180/427 |
| 7,428,944 B2 | 9/2008 | Gerum | |
| 7,461,863 B2 | 12/2008 | Muller | |
| 7,495,584 B1 | 2/2009 | Sorensen | |
| 7,533,594 B2 | 5/2009 | Menjak et al. | |
| 7,628,244 B2 | 12/2009 | Chino et al. | |
| 7,719,431 B2 | 5/2010 | Bolourchi | |
| 7,735,405 B2 | 6/2010 | Parks | |
| 7,758,073 B1 | 7/2010 | Chou | |
| 7,775,129 B2 | 8/2010 | Oike et al. | |
| 7,784,830 B2 | 8/2010 | Ulintz | |
| 7,793,980 B2 | 9/2010 | Fong | |
| 7,862,079 B2 | 1/2011 | Fukawatase et al. | |
| 7,975,569 B2 | 1/2011 | Klos | |
| 7,894,951 B2 | 2/2011 | Norris et al. | |
| 7,909,361 B2 | 3/2011 | Oblizajek et al. | |
| 8,002,075 B2 | 8/2011 | Markfort | |
| 8,011,265 B2 * | 9/2011 | Menjak | B62D 1/181 74/425 |
| 8,027,767 B2 | 9/2011 | Klein et al. | |
| 8,055,409 B2 | 11/2011 | Tsuchiya | |
| 8,069,745 B2 | 12/2011 | Strieter et al. | |
| 8,079,312 B2 | 12/2011 | Long | |
| 8,146,945 B2 | 4/2012 | Born et al. | |
| 8,161,839 B2 * | 4/2012 | Warashina | B62D 1/181 74/493 |
| 8,170,725 B2 | 5/2012 | Chin et al. | |
| 8,260,482 B1 | 9/2012 | Szybalski et al. | |
| 8,352,110 B1 | 1/2013 | Szybalski et al. | |
| 8,466,382 B2 | 6/2013 | Donicke | |
| 8,479,605 B2 | 7/2013 | Shavrnoch et al. | |
| 8,548,667 B2 | 10/2013 | Kaufmann | |
| 8,606,455 B2 | 12/2013 | Boehringer et al. | |
| 8,634,980 B1 | 1/2014 | Urmson et al. | |
| 8,650,982 B2 | 2/2014 | Matsuno et al. | |
| 8,670,891 B1 | 3/2014 | Szybalski et al. | |
| 8,695,750 B1 | 4/2014 | Hammond et al. | |
| 8,733,201 B2 | 5/2014 | Okano et al. | |
| 8,818,608 B2 | 8/2014 | Cullinane et al. | |
| 8,825,258 B2 | 9/2014 | Cullinane et al. | |
| 8,825,261 B1 | 9/2014 | Szybalski et al. | |
| 8,843,268 B2 | 9/2014 | Lathrop et al. | |
| 8,874,301 B1 | 10/2014 | Rao et al. | |
| 8,880,287 B2 | 11/2014 | Lee et al. | |
| 8,881,861 B2 | 11/2014 | Tojo | |
| 8,899,623 B2 | 12/2014 | Stadler et al. | |
| 8,909,428 B1 | 12/2014 | Lombrozo | |
| 8,948,993 B2 | 2/2015 | Schulman et al. | |
| 8,950,543 B2 | 2/2015 | Heo et al. | |
| 8,955,407 B2 | 2/2015 | Sakuma | |
| 8,994,521 B2 | 3/2015 | Gazit | |
| 9,002,563 B2 | 4/2015 | Green et al. | |
| 9,031,729 B2 | 5/2015 | Lathrop et al. | |
| 9,032,835 B2 | 5/2015 | Davies et al. | |
| 9,039,041 B2 | 5/2015 | Buzzard et al. | |
| 9,045,078 B2 | 6/2015 | Tovar et al. | |
| 9,073,574 B2 | 7/2015 | Cuddihy et al. | |
| 9,080,895 B2 | 7/2015 | Martin et al. | |
| 9,092,093 B2 | 7/2015 | Jubner et al. | |
| 9,108,584 B2 | 8/2015 | Rao et al. | |
| 9,134,729 B1 | 9/2015 | Szybalski et al. | |
| 9,150,200 B2 | 10/2015 | Urhahne | |
| 9,150,224 B2 | 10/2015 | Yopp | |
| 9,164,619 B2 | 10/2015 | Goodlein | |

(56) References Cited

U.S. PATENT DOCUMENTS

| | | |
|---|---|---|
| 9,174,642 B2 | 11/2015 | Wimmer et al. |
| 9,186,994 B2 | 11/2015 | Okuyama et al. |
| 9,193,375 B2 | 11/2015 | Schramm et al. |
| 9,199,553 B2 | 12/2015 | Cuddihy et al. |
| 9,227,531 B2 | 1/2016 | Cuddihy et al. |
| 9,233,638 B2 | 1/2016 | Lisseman et al. |
| 9,235,111 B2 | 1/2016 | Davidsson et al. |
| 9,235,987 B2 | 1/2016 | Green et al. |
| 9,238,409 B2 | 1/2016 | Lathrop et al. |
| 9,248,743 B2 | 2/2016 | Enthaler et al. |
| 9,260,130 B2 | 2/2016 | Mizuno |
| 9,290,174 B1 | 3/2016 | Zagorski |
| 9,290,201 B1 | 3/2016 | Lombrozo |
| 9,298,184 B2 | 3/2016 | Bartels et al. |
| 9,308,857 B2 | 4/2016 | Lisseman et al. |
| 9,308,891 B2 | 4/2016 | Cudak et al. |
| 9,333,983 B2 | 5/2016 | Lathrop et al. |
| 9,352,752 B2 | 5/2016 | Cullinane et al. |
| 9,360,108 B2 | 6/2016 | Pfenninger et al. |
| 9,360,865 B2 | 6/2016 | Yopp |
| 9,421,994 B2 | 8/2016 | Agbor et al. |
| 9,487,228 B2 | 11/2016 | Febre et al. |
| 9,550,514 B2 | 1/2017 | Schulz et al. |
| 9,616,914 B2 * | 4/2017 | Stinebring ............ B62D 1/181 |
| 9,643,641 B1 * | 5/2017 | Stinebring ............ B62D 1/195 |
| 9,663,136 B2 * | 5/2017 | Stinebring ............ B62D 1/195 |
| 9,744,983 B2 * | 8/2017 | Stinebring ............ B62D 1/181 |
| 9,828,016 B2 | 11/2017 | Lubischer et al. |
| 9,845,106 B2 | 12/2017 | Bodtker |
| 9,849,904 B2 * | 12/2017 | Rouleau ............... B62D 1/181 |
| 9,852,752 B1 | 12/2017 | Chou et al. |
| 9,862,403 B1 | 1/2018 | Rouleau et al. |
| 9,919,724 B2 * | 3/2018 | Lubischer ............ B62D 1/181 |
| 10,065,655 B2 | 9/2018 | Bendewald et al. |
| 2002/0171235 A1 | 11/2002 | Riefe et al. |
| 2003/0046012 A1 | 3/2003 | Yamaguchi |
| 2003/0094330 A1 | 5/2003 | Boloorchi et al. |
| 2003/0146037 A1 | 8/2003 | Menjak et al. |
| 2003/0188598 A1 | 10/2003 | Cartwright |
| 2003/0227159 A1 | 12/2003 | Muller |
| 2004/0016588 A1 | 1/2004 | Vitale et al. |
| 2004/0046346 A1 | 3/2004 | Eki et al. |
| 2004/0046379 A1 | 3/2004 | Riefe |
| 2004/0099083 A1 | 5/2004 | Choi et al. |
| 2004/0099468 A1 | 5/2004 | Chernoff et al. |
| 2004/0129098 A1 | 7/2004 | Gayer et al. |
| 2004/0204808 A1 | 10/2004 | Satoh et al. |
| 2004/0262063 A1 | 12/2004 | Kaufmann et al. |
| 2005/0001445 A1 | 1/2005 | Ercolano |
| 2005/0081675 A1 | 4/2005 | Oshita et al. |
| 2005/0197746 A1 | 9/2005 | Pelchen et al. |
| 2005/0242562 A1 | 11/2005 | Ridgway et al. |
| 2005/0263996 A1 | 12/2005 | Manwaring et al. |
| 2005/0275205 A1 | 12/2005 | Ahnafield |
| 2006/0005658 A1 | 1/2006 | Armstrong et al. |
| 2006/0186658 A1 | 8/2006 | Yasuhara et al. |
| 2006/0219499 A1 | 10/2006 | Organek |
| 2006/0224287 A1 | 10/2006 | Izawa et al. |
| 2006/0237959 A1 | 10/2006 | Dimig et al. |
| 2006/0244251 A1 | 11/2006 | Muller |
| 2006/0283281 A1 | 12/2006 | Li et al. |
| 2007/0021889 A1 | 1/2007 | Tsuchiya |
| 2007/0029771 A1 | 2/2007 | Haglund et al. |
| 2007/0046003 A1 | 3/2007 | Mori et al. |
| 2007/0046013 A1 | 3/2007 | Bito et al. |
| 2007/0096446 A1 | 5/2007 | Breed |
| 2007/0158116 A1 | 7/2007 | Peppler |
| 2007/0241548 A1 | 10/2007 | Fong |
| 2007/0284867 A1 | 12/2007 | Cymbal et al. |
| 2008/0009986 A1 | 1/2008 | Lu et al. |
| 2008/0047382 A1 * | 2/2008 | Tomaru ............... B62D 1/181 |
| | | 74/388 PS |
| 2008/0079253 A1 * | 4/2008 | Sekii ................... B62D 1/181 |
| | | 280/775 |
| 2008/0216597 A1 | 9/2008 | Iwakawa et al. |
| 2008/0238068 A1 | 10/2008 | Kumar et al. |
| 2009/0024278 A1 | 1/2009 | Kondo et al. |
| 2009/0056493 A1 | 3/2009 | Dubay et al. |
| 2009/0107284 A1 | 4/2009 | Lucas et al. |
| 2009/0229400 A1 | 9/2009 | Ozsoylu et al. |
| 2009/0256342 A1 | 10/2009 | Cymbal et al. |
| 2009/0266195 A1 | 10/2009 | Tanke et al. |
| 2009/0276111 A1 | 11/2009 | Wang et al. |
| 2009/0280914 A1 | 11/2009 | Kakutani et al. |
| 2009/0292466 A1 | 11/2009 | McCarthy et al. |
| 2010/0152952 A1 | 6/2010 | Lee et al. |
| 2010/0218637 A1 | 9/2010 | Barroso |
| 2010/0222976 A1 | 9/2010 | Haug |
| 2010/0228417 A1 | 9/2010 | Lee et al. |
| 2010/0228438 A1 | 9/2010 | Buerkle |
| 2010/0280713 A1 | 11/2010 | Stahlin et al. |
| 2010/0286869 A1 | 11/2010 | Katch et al. |
| 2010/0288567 A1 | 11/2010 | Bonne |
| 2011/0098922 A1 | 4/2011 | Ibrahim |
| 2011/0153160 A1 | 6/2011 | Hesseling et al. |
| 2011/0167940 A1 | 7/2011 | Shavrnoch et al. |
| 2011/0187518 A1 | 8/2011 | Strumolo et al. |
| 2011/0266396 A1 | 11/2011 | Abildgaard et al. |
| 2011/0282550 A1 | 11/2011 | Tada et al. |
| 2012/0136540 A1 | 5/2012 | Miller |
| 2012/0205183 A1 | 8/2012 | Rombold |
| 2012/0209473 A1 | 8/2012 | Birsching et al. |
| 2012/0215377 A1 | 8/2012 | Takemura et al. |
| 2012/0247259 A1 | 10/2012 | Mizuno et al. |
| 2012/0287050 A1 | 11/2012 | Wu |
| 2013/0002416 A1 | 1/2013 | Gazit |
| 2013/0325202 A1 | 1/2013 | Howard et al. |
| 2013/0087006 A1 | 4/2013 | Ohtsubo et al. |
| 2013/0104689 A1 | 5/2013 | Marutani et al. |
| 2013/0133463 A1 | 5/2013 | Moriyama |
| 2013/0158771 A1 | 6/2013 | Kaufmann |
| 2013/0174686 A1 | 7/2013 | Hirche et al. |
| 2013/0199866 A1 | 8/2013 | Yamamoto et al. |
| 2013/0205933 A1 | 8/2013 | Moriyama |
| 2013/0218396 A1 | 8/2013 | Moshchuk et al. |
| 2013/0233117 A1 | 9/2013 | Read et al. |
| 2013/0325264 A1 | 12/2013 | Alcazar et al. |
| 2014/0028008 A1 | 1/2014 | Stadler et al. |
| 2014/0046542 A1 | 2/2014 | Kauffman et al. |
| 2014/0046547 A1 | 2/2014 | Kaufmann et al. |
| 2014/0111324 A1 | 4/2014 | Lisseman et al. |
| 2014/0300479 A1 | 4/2014 | Wolter et al. |
| 2014/0116187 A1 | 5/2014 | Tinnin |
| 2014/0137694 A1 | 5/2014 | Sugiura |
| 2014/0277896 A1 | 9/2014 | Lathrop et al. |
| 2014/0309816 A1 | 10/2014 | Stefan et al. |
| 2015/0002404 A1 | 1/2015 | Hooton |
| 2015/0014086 A1 | 1/2015 | Eisenbarth |
| 2015/0032322 A1 | 1/2015 | Wimmer |
| 2015/0051780 A1 | 1/2015 | Hahne |
| 2015/0120142 A1 | 1/2015 | Park et al. |
| 2015/0210273 A1 | 2/2015 | Kaufmann et al. |
| 2015/0060185 A1 | 3/2015 | Feguri |
| 2015/0246673 A1 | 4/2015 | Tseng et al. |
| 2015/0137492 A1 | 5/2015 | Rao et al. |
| 2015/0203145 A1 | 7/2015 | Sugiura et al. |
| 2015/0251666 A1 | 7/2015 | Attard et al. |
| 2015/0283998 A1 | 9/2015 | Lind et al. |
| 2015/0324111 A1 | 9/2015 | Jubner et al. |
| 2016/0009332 A1 | 1/2016 | Sirbu |
| 2016/0016604 A1 | 1/2016 | Johta et al. |
| 2016/0075371 A1 | 3/2016 | Varunkikar et al. |
| 2016/0082867 A1 | 3/2016 | Sugioka et al. |
| 2016/0200246 A1 | 3/2016 | Lisseman et al. |
| 2016/0114828 A1 | 4/2016 | Tanaka et al. |
| 2016/0185387 A1 | 6/2016 | Kuoch |
| 2016/0200343 A1 | 6/2016 | Lisseman et al. |
| 2016/0200344 A1 | 7/2016 | Sugioka et al. |
| 2016/0207538 A1 | 7/2016 | Urano et al. |
| 2016/0209841 A1 | 7/2016 | Yamaoka et al. |
| 2016/0229450 A1 | 7/2016 | Basting et al. |
| 2016/0231743 A1 | 7/2016 | Bendewald et al. |
| 2016/0244070 A1 | 8/2016 | Bendewald et al. |
| 2016/0244086 A1 | 8/2016 | Moriyama |

(56) References Cited

U.S. PATENT DOCUMENTS

| | | |
|---|---|---|
| 2016/0318540 A1 | 11/2016 | King |
| 2016/0318542 A1 | 11/2016 | Pattok et al. |
| 2016/0347347 A1 | 12/2016 | Lubischer |
| 2016/0347348 A1 | 12/2016 | Lubischer |
| 2016/0362084 A1 | 12/2016 | Martin et al. |
| 2016/0362117 A1 | 12/2016 | Kaufmann et al. |
| 2016/0362126 A1 | 12/2016 | Lubischer |
| 2016/0368522 A1 | 12/2016 | Lubischer |
| 2016/0375770 A1 | 12/2016 | Ryne et al. |
| 2016/0375860 A1 | 12/2016 | Lubischer |
| 2016/0375923 A1 | 12/2016 | Schulz |
| 2016/0375924 A1 | 12/2016 | Bodtker et al. |
| 2016/0375925 A1 | 12/2016 | Lubischer et al. |
| 2016/0375926 A1 | 12/2016 | Lubischer et al. |
| 2016/0375927 A1 | 12/2016 | Schulz et al. |
| 2016/0375928 A1 | 12/2016 | Magnus |
| 2016/0375929 A1 | 12/2016 | Rouleau |
| 2016/0375931 A1 | 12/2016 | Lubischer |
| 2017/0029009 A1 | 2/2017 | Rouleau |
| 2017/0029018 A1 | 2/2017 | Lubischer |
| 2017/0097071 A1 | 4/2017 | Galehr |
| 2017/0106894 A1 | 4/2017 | Bodtker |
| 2017/0113589 A1 | 4/2017 | Riefe |
| 2017/0113712 A1 | 4/2017 | Watz |
| 2017/0151975 A1 | 7/2017 | Schmidt et al. |
| 2017/0294120 A1 | 10/2017 | Ootsuji |
| 2017/0297606 A1 | 10/2017 | Kim et al. |
| 2017/0341677 A1 | 11/2017 | Buzzard et al. |
| 2017/0361863 A1 | 12/2017 | Rouleau |
| 2017/0369091 A1 | 12/2017 | Nash |
| 2018/0029628 A1 | 2/2018 | Sugishita |
| 2018/0050720 A1 | 2/2018 | King et al. |
| 2018/0072339 A1 | 3/2018 | Bodtker |
| 2018/0079441 A1 | 3/2018 | McKinzie et al. |
| 2018/0086378 A1 | 3/2018 | Bell et al. |
| 2018/0148084 A1 | 5/2018 | Nash et al. |
| 2018/0154932 A1 | 6/2018 | Rakouth et al. |
| 2018/0251147 A1* | 9/2018 | Heitz .................... B62D 1/181 |
| 2019/0111960 A1* | 4/2019 | Freudenstein ......... B62D 1/181 |

FOREIGN PATENT DOCUMENTS

| | | | |
|---|---|---|---|
| CN | 1722030 A | | 1/2006 |
| CN | 1736786 A | | 2/2006 |
| CN | 101037117 A | | 9/2007 |
| CN | 101041355 A | | 9/2007 |
| CN | 101049814 A | | 10/2007 |
| CN | 101291840 A | | 10/2008 |
| CN | 101402320 A | | 4/2009 |
| CN | 101596903 A | | 12/2009 |
| CN | 201534560 U | | 7/2010 |
| CN | 101954862 A | | 1/2011 |
| CN | 102161346 A | | 8/2011 |
| CN | 102452391 A | | 5/2012 |
| CN | 102523738 A | | 6/2012 |
| CN | 102574545 A | | 7/2012 |
| CN | 202337282 U | | 7/2012 |
| CN | 102806937 A | | 12/2012 |
| CN | 103085854 A | | 5/2013 |
| CN | 103419840 A2 | | 12/2013 |
| CN | 103569185 A | | 2/2014 |
| CN | 103587571 A | | 2/2014 |
| CN | 203793405 U | | 8/2014 |
| CN | 204222957 U | | 3/2015 |
| DE | 4310431 A1 | | 10/1994 |
| DE | 19523214 A1 | | 1/1997 |
| DE | 19923012 A1 | | 11/2000 |
| DE | 19954505 A1 | | 5/2001 |
| DE | 10212782 A1 | | 10/2003 |
| DE | 102005032528 A1 | | 1/2007 |
| DE | 102005056438 A1 | | 6/2007 |
| DE | 102006025254 A1 | | 12/2007 |
| DE | 1020081057313 A1 | | 10/2009 |
| DE | 102010025197 A1 | | 12/2011 |
| DE | 102013110865 A1 | | 4/2015 |
| DE | 102015216326 B4 | | 9/2016 |
| EP | 1559630 A2 | | 8/2005 |
| EP | 1783719 A2 | | 5/2007 |
| EP | 1932745 A2 | | 6/2008 |
| EP | 2384946 A2 | | 11/2011 |
| EP | 2426030 A1 | | 3/2012 |
| EP | 2489577 A2 | | 8/2012 |
| EP | 2604487 A1 | | 6/2013 |
| EP | 1606149 B1 | | 5/2014 |
| FR | 2862595 A1 | | 5/2005 |
| FR | 3016327 A1 | | 7/2015 |
| JP | S60157963 A | | 8/1985 |
| JP | H05162652 A | | 6/1993 |
| JP | 2007253809 A | | 10/2007 |
| KR | 20100063433 A | | 6/2010 |
| KR | 101062339 B1 | | 9/2011 |
| WO | 2006099483 A1 | | 9/2006 |
| WO | 2010082394 A1 | | 7/2010 |
| WO | 2010116518 A1 | | 10/2010 |
| WO | 2014208573 A1 | | 12/2014 |

OTHER PUBLICATIONS

CN Patent Application No. 201210599006.6 First Office Action dated Jan. 27, 2015, 9 pages.

CN Patent Application No. 201210599006.6 Second Office Action dated Aug. 5, 2015, 5 pages.

CN Patent Application No. 201310178012.9 First Office Action dated Apr. 13, 2015, 13 pages.

CN Patent Application No. 201310178012.9 Second Office Action dated Dec. 28, 2015, 11 pages.

CN Patent Application No. 201410089167 First Office Action and Search Report dated Feb. 3, 2016, 9 pages.

EP Application No. 14156903.8 Extended European Search Report, dated Jan. 27, 2015, 10 pages.

EP Application No. 14156903.8 Office Action dated Nov. 16, 2015, 4 pages.

EP Application No. 14156903.8 Office Action dated May 31, 2016, 5 pages.

EP Application No. 14156903.8 Partial European Search Report dated Sep. 23, 2014, 6 pages.

EP Application No. 15152834.6 Extended European Search Report dated Oct. 8, 2015, 7 pages.

European Application No. 12196665.9 Extended European Search Report dated Mar. 6, 2013, 7 pages.

European Search Report for European Application No. 13159950.8; dated Jun. 6, 2013; 7 pages.

Gillespie, Thomas D.; "Fundamentals of Vehicle Dynamics"; Society of Automotive Engineers, Inc.; published 1992; 294 pages.

Kichun, et al.; "Development of Autonomous Car-Part II: A Case Study on the Implementation of an Autonomous Driving System Based on Distributed Architecture"; IEEE Transactions on Industrial Electronics, vol. 62, No. 8, Aug. 2015; 14 pages.

Van der Jagt, Pim; "Prediction of Steering Efforts During Stationary or Slow Rolling Parking Maneuvers"; Ford Forschungszentrum Aachen GmbH.; Oct. 27, 1999; 20 pages.

Varunjikar, Tejas; Design of Horizontal Curves With DownGrades Using Low-Order Vehicle Dynamics Models; A Theisis by T. Varunkikar; 2011; 141 pages.

English translation regarding DE102015216326B4, ThyssenKrupp AG; 21 pgs. Sep. 8, 2016.

Chinese Office Action & Search Report for Chinese Application No. 201610427896.0 dated Oct. 27, 2017, 16 pages, English Translation Included.

Chinese Office Action & Search Report for Chinese Application No. 201610609647.3 dated Mar. 12, 2018, 5 pages, no English translation available.

Chinese Office Action & Search Report for Chinese Application No. 201610620335.2 dated Jan. 22, 2018, 15 pages, English Translation Included.

Chinese Office Action & Search Report for Chinese Application No. 201610642300.9 dated Feb. 7, 2018, 22 pages, English Translation Only.

(56) References Cited

OTHER PUBLICATIONS

Chinese Office Action & Search Report for Chinese Application No. 201610651953.3 dated Jan. 25, 2018, 12 pages, English Translation Included.
Chinese Office Action & Search Report for Chinese Application No. 201610830809.6 dated Mar. 12, 2018, 11 pages, English Translation Included.
Chinese Office Action & Search Report for Chinese Application No. 201610830810.9 dated Jan. 31, 2018, 18 pages, English Translation Included.
Chinese Office Action & Search Report for Chinese Application No. 201611113746.9 dated May 4, 2018, 11 pages, English Translation Included.
CN Chinese Office Action & Search Report for Chinese Application No. 201610620335.2 dated Aug. 7, 2018, 16 pages, English Translation Included.

* cited by examiner

SELF-LOCKING TELESCOPE ACTUATOR OF A STEERING COLUMN ASSEMBLY

CROSS-REFERENCES TO RELATED APPLICATION

This patent application claims priority to U.S. Provisional Patent Application Ser. No. 62/352,809 filed Jun. 21, 2016 which is incorporated herein by reference in its entirety.

BACKGROUND

The present disclosure relates to steering column assemblies, and more particularly, to assemblies with telescope actuators.

Telescope actuators used for telescoping steering column assemblies may generally have an electric mode and a manual mode of operation. Such actuators when coupled to an energy absorbing (E/A) device may render the E/A device inoperable when the steering column assembly is in the manual mode, and/or may limit and/or complicate design options with regard to E/A devices.

Accordingly, it is desirable to provide a telescope actuator capable of both powered and manual modes of operation while utilizing a robust and simplified E/A device that is operable in both modes.

SUMMARY

In one exemplary embodiment of the present disclosure, an extendable steering column assembly includes a steering shaft, an energy absorption device, and a self-locking telescope actuator. The steering shaft is configured to rotate about an axis, and includes a forward shaft portion mounted for rotation to a fixed support structure, and a rearward shaft portion mounted for rotation to a jacket. The rearward shaft portion is configured to axially translate with the jacket. The energy absorption device is engaged to the jacket. The telescope actuator includes a rod extending along a centerline, a nut threaded to the rod, and a casing in operable contact with the nut. Rotational motion along with axial translational motion is induced between the rod and the nut when at least in at least a power state.

In another embodiment, an extendable steering column assembly includes a steering shaft, an energy absorption device, and a telescope actuator. The steering shaft is configured to rotate about an axis, and includes a forward shaft portion mounted for rotation to a support structure, and a rearward shaft portion mounted for rotation to a jacket. The rearward shaft portion is configured to axially translate with the jacket and with respect to the support structure and the forward shaft portion. The energy absorption device is engaged to the jacket. The telescope actuator includes a screw engaged to the support structure and extending along a centerline. The shuttle assembly is engaged between the energy absorption device and the screw. At least a portion of the shuttle assembly is configured to translate axially along the centerline with the energy absorption device, the rearward shaft portion, and the jacket when in a power state and when in a manual state. At least the portion of the shuttle assembly is configured to generally not translate when in an energy absorption state.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and, other features, and advantages of the invention are apparent from the following detailed description taken in conjunction with the accompanying drawings in which:

DETAILED DESCRIPTION

Referring now to the Figures, where the invention will be described with reference to specific embodiments, without limiting same, an extendable steering column assembly 20 is illustrated as one, non-limiting, example of an application for a self-locking telescope actuator 22. The steering column assembly 20 with incorporation of the self-locking telescope actuator 22 may be adapted for an autonomous vehicle. For example, the steering column assembly 20 may be, or may be part of, a steering wheel on-demand system. In this application, the self-locking telescope actuator 22 may be adapted to decouple, thus facilitating the driver acquisition of a steering wheel from a stowed position. When the self-locking telescope actuator 22 is in the decoupled state, the actuator 22 may be further configured to lock for enhancement of crashworthiness protections since the load to move the column when decoupled is much less than energy absorption (E/A) loads. It is further contemplated and understood that the self-locking telescope actuator 22 may be applied to any telescoping steering column assembly.

Figure 1:
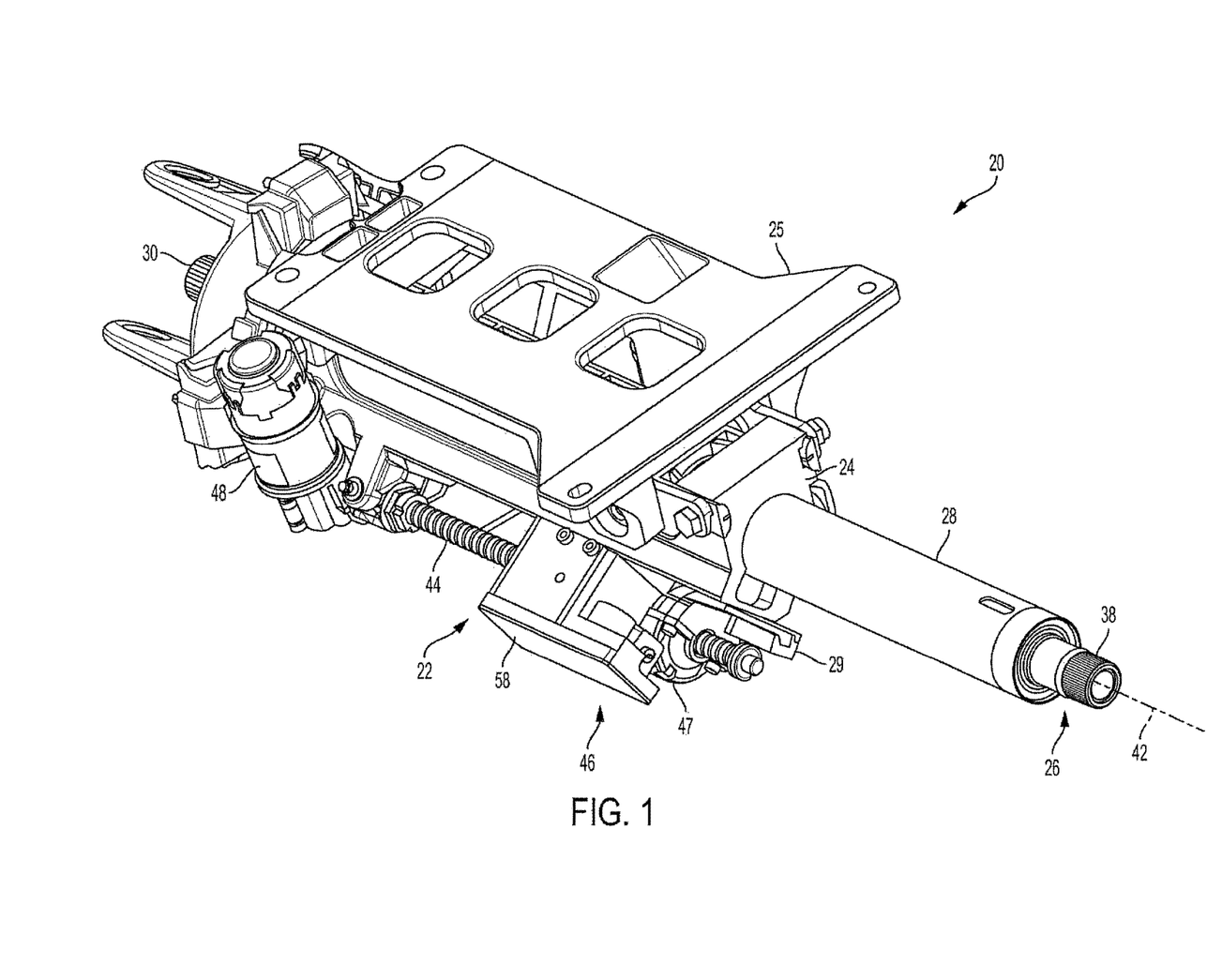
FIG. 1 is a perspective view of a steering column assembly in accordance with an exemplary embodiment of the present invention.
Figure 2:
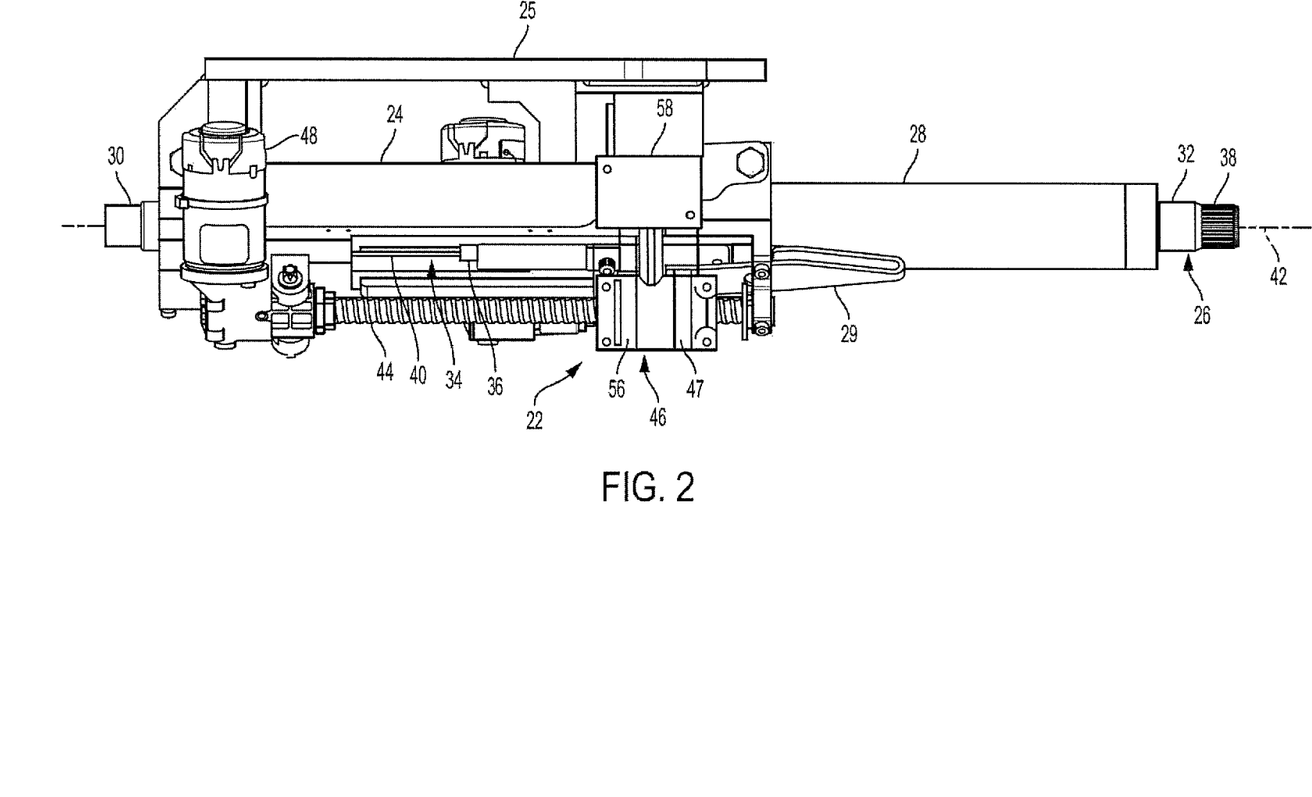
FIG. 2 is a side view of the steering column assembly.
Figure 3:
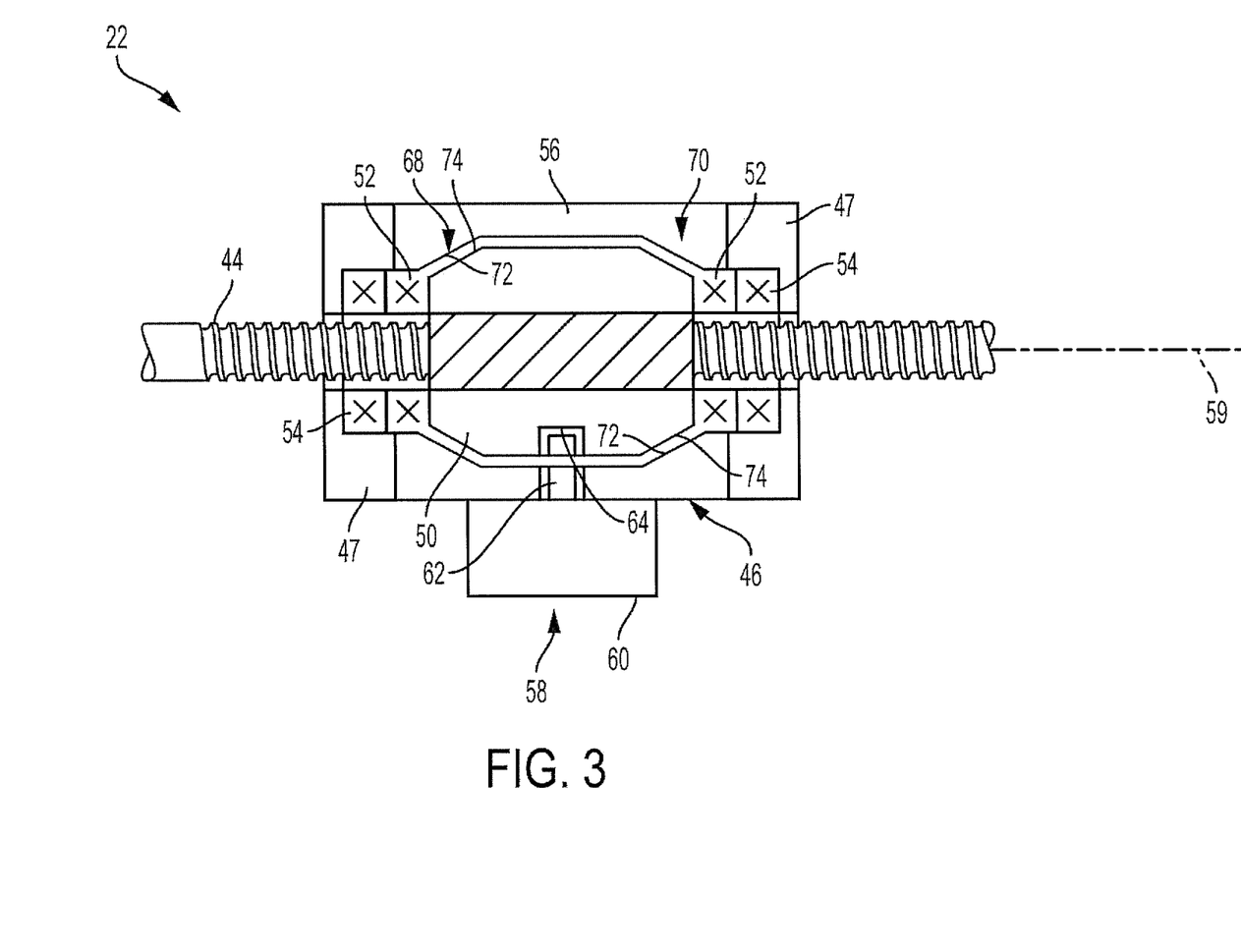
FIG. 3 is cross section of a shuttle assembly of the self-locking telescope actuator of the steering column assembly.

Referring to FIG. 1, the extendable steering column assembly 20 may include a support structure or lower jacket 24, a rotating steering shaft 26, a shaft housing or upper jacket 28, an E/A device 29 (e.g., E/A strap), and the self-locking telescope actuator 22. The angle of the lower jacket 24 with respect to a column support bracket 25 may be adjustable. A column support bracket 25 may be stationary and rigidly mounted to a framework of a vehicle (not shown). Referring to FIGS. 2 and 3, the rotating steering shaft 26 may include a forward shaft portion 30 (i.e., with respect to the vehicle), a rearward shaft portion 32, and an axial slip junction 34. The rearward shaft portion 32 may be rotatably supported by the upper jacket 28, and includes a forward end segment 36 and an opposite rearward end segment 38. The rearward end segment 38 is constructed and arranged for mounting of a hand steering wheel (not shown). The forward shaft portion 30 may be rotatably mounted to the lower jacket 24, and includes a rearward end segment 40.

The axial slip junction 34 is configured to permit rotation of the steering shaft 26 about an axis 42 while enabling axial extension and retraction of the shaft. The axial slip junction 34 may be splined, and is carried between the rearward end segment 40 of the forward shaft portion 30 and the forward end segment 36 of the rearward shaft portion 32. In operation and as the steering column assembly 20 retracts from an axially extended position, an axial overlap of the forward shaft portion 30 to the rearward shaft portion 32 increases, and vice versa.

In one embodiment, the forward shaft portion 30 may be mounted for rotation to the lower jacket 24, and may not translate axially with respect to axis 42. The upper jacket 28 may be supported by the lower jacket 24, may translate axially with respect to the lower jacket 24, and may not rotate.

The E/A strap 29 is adapted to absorb energy when a substantial axial force is applied in an axial forward direction to, for example, the steering wheel, during an energy absorption event. One end of the E/A strap 29 may be mounted to the self-locking telescope actuator 22, and an opposite end of the strap may be mounted to the upper jacket 28.

Referring to FIGS. 1-3, the self-locking telescope actuator 22 may be constructed and arranged to operate in a powered state (i.e., electrically extends and retracts the steering column), a manual or decoupled state (i.e., generally permits a driver to manually extend and/or retract the steering column), and an energy absorption or lock state (i.e., occurs during the energy absorption event). The self-locking telescope actuator 22 may include a screw or threaded rod 44, a shuttle assembly 46, and a drive means 48 (e.g., electric motor, see FIG. 1). The shuttle assembly 46 may include a shuttle 47 and a clutch device 58 that may be directly supported by and engaged to the shuttle 47, or a casing 56 of the shuttle 47.

The shuttle 47 of the shuttle assembly 46 may be mounted between the screw 44 and the E/A strap 29. More specifically, the shuttle assembly 46 is threadably mounted to the screw 44 for axial translation along the screw, and may be rigidly fixed to the E/A strap 29. In operation and when the electric motor 48 is rotating the screw 44, the shuttle assembly 46 axially translates along the rotating screw 44. During this axial translation, the rearward shaft portion 32 of the steering shaft 26 (see FIG. 2) and the upper jacket 28 is carried by, and with, the shuttle assembly 46.

Referring to FIGS. 2 and 3, the shuttle assembly 46 may further include a nut or fixture 50, at least one bearing 52, at least one resilient member 54 (e.g., a coiled spring or a disc spring), and the casing 56. The screw 44 may be mounted for rotation to the lower jacket 24 and about a centerline 59, may not be mounted for axial translation along the lower jacket 24, and is rotatably driven by the electric motor 48 that may be rigidly mounted to the fixed lower jacket 24. The centerline 59 may be spaced from, and substantially parallel to, the axis 42.

The clutch device 58 may be mounted to the casing 56 and facilitates rotational decoupling of the nut 50 from the casing 56 (and/or shuttle 47). The clutch device 58 may include an electric servo 60 and a bolt 62. The servo 60 may be mounted to an exterior of the casing 56 and functions to move the bolt 62 into and out of at least one recess 64 defined by an external and circumferentially continuous surface of the nut 50. In one example, the recesses 64 may be axially extending grooves.

In the present example, the casing 56 may be an integral part of the shuttle assembly 46 (i.e., one-piece), and thus axially translates with the shuttle assembly 46. The nut 50, the bearings 52, and the spring 54 may be mounted to the screw 44 inside the casing 56. The nut 50 is threaded to the screw 44 such that rotation of the screw 44 about centerline 59 causes the casing 56 and shuttle assembly 46 to axially translate along the screw 44. A first bearing 52 may be axially located between a first spring 54 and a forward end (i.e. annular face) of the nut 50. A second bearing 52 may be axially located between a second spring 54 and a rearward end of the nut 50.

In operation and when the steering column assembly 20 is in the powered state and the clutch device 58 is engaged, the forward and rearward bearings 52 minimize any friction produced between the springs 54 and the respective ends of the nut. The axial forces produced by the torque placed upon the screw 44 by the electric motor 48 when in the powered state are not sufficient to overcome the compressive force of the springs 54 (i.e., the springs do not compress axially).

When the steering column assembly 20 is in the decoupled state (i.e., not powered by the electric motor 48), the clutch device 58 is not engaged (i.e., the servo 60 is de-energized). A manual axial force produced by the driver to axially extend and or retract the steering column assembly 20 may cause the nut 50 to free-wheel (i.e., back spin) upon the, now stationary, screw 44 enabling the shuttle assembly 46 to axially translate.

Referring to FIG. 3, to facilitate the E/A state, the self-locking telescope actuator 22 may further include forward and rearward locking stops 68, 70 each carried between the casing 56 and the nut 50. Each stop 68, 70 may include an inward face 72 that may be conical in shape and carried by the casing 56, and an outward surface 74 that may be conical in shape, opposes the inward face 72, and may be conical in shape. In operation, when the steering column assembly 20 is in the powered state, the clutch device 58 is engaged and the nut 50 will not free wheel, thus the E/A strap 29 may function as intended. However, when the steering column assembly 20 is in the decoupled state, the nut 50 is capable of free-wheeling, thus generally disabling the E/A strap 29 unless otherwise locked.

In order to efficiently and immediately lock the nut 50 to the casing 56, thus effectively causing a rigid engagement of the upper jacket 28 to the lower jacket 24 via the E/A strap 29, the forward and rearward locking stops 68, 70 are implemented. For example, an E/A event that applies a sufficient axial force to the rearward shaft portion 32 in a forward direction will have sufficient force (i.e., definition of E/A event) to overcome the spring constant of the forward spring 54. Forward spring 54 thus compresses axially and the nut 50 rotates slightly upon the screw 44 until the forward locking stop 68 locks the nut upon the casing 56. Once locked, the E/A strap 29 may function as intended.

In operation of the manual state, the nut 50 is uncoupled from the electric motor 48 through the clutch device 58. Forces are then applied by the driver to the steering wheel causing the lead screw 44 to back drive the nut 50, where the nut is suspended between two spring loaded bearings 52. The force to compress the springs 54 is greater than the force to move the steering column. The nut 50 spins on the lead screw 44 allowing manual adjustment of the telescope position.

In operation of the power state, the nut 50 is coupled to the electric motor 48 through the clutch device 58. Forces are applied by the electric motor 48 causing the screw 44 to rotate and the nut 50 to translate along the screw 44. The translating nut 50 causes the upper jacket 28 to move along the telescope axis 42. The nut 50 remains suspended between the two spring loaded bearings 52. The force to compress the springs 54 is greater than the force to move the steering column.

Rotation of the screw 44 may only be accomplished when the electric motor 48 (i.e., drive means) is running. If the nut 50 is locked (i.e., bolt 62 is engaged with the peripheral slot 64), rotation of the screw 44 via the electric motor 48, when in the powered state, may cause the nut 50 to move the shuttle assembly 46 axially, and with it, the upper jacket 28. Any manual forces applied to the steering column when in the powered state may not result in steering column motion.

If the nut 50 is not locked (i.e., bolt 62 is not engaged with the peripheral slot 64) then the back spinning of the nut facilitates the manual, axial, movement of the steering wheel, upper jacket 28, shuttle assembly 46, and nut 50 along the screw 44. This manual movement is generally the manual state, and manual forces applied to the steering column when in the manual state may result in steering column motion.

Figure 4:
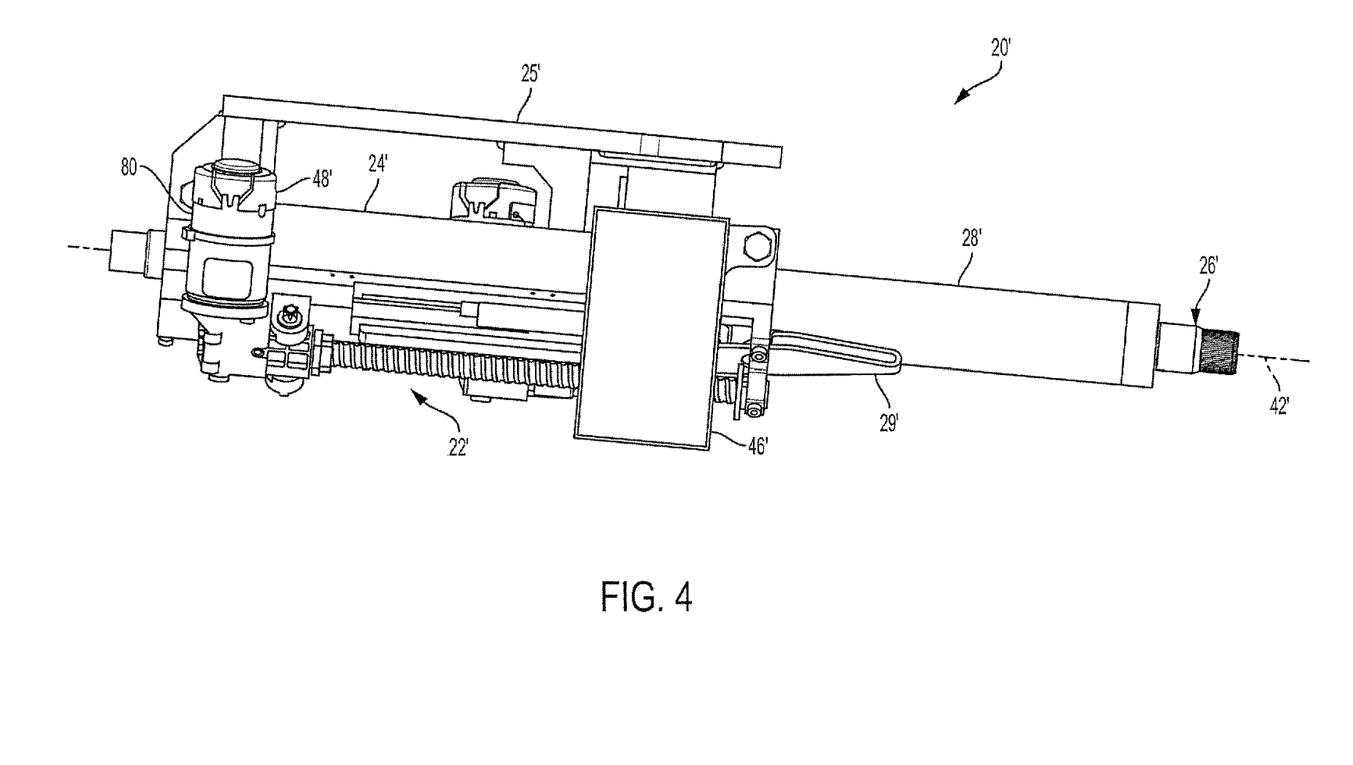
FIG. 4 is a side view of a second embodiment of the steering column assembly.
Figure 5:
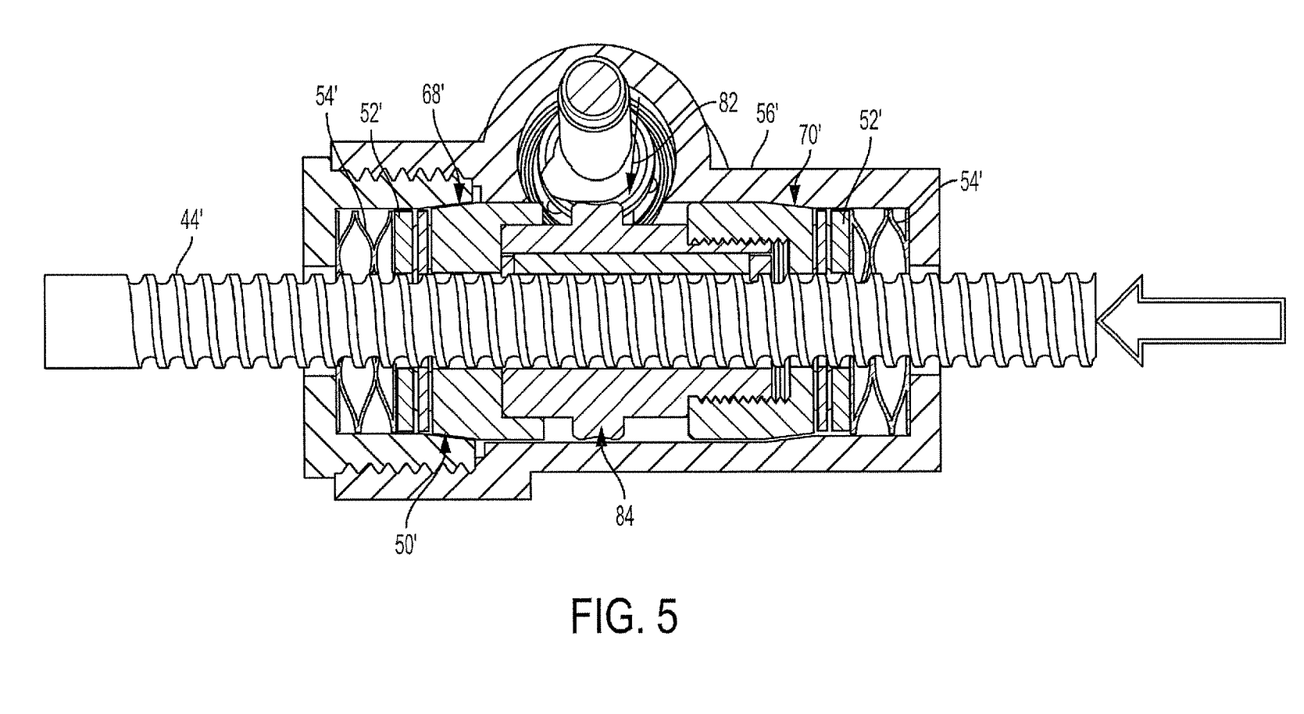
FIG. 5 is a partial cross section of a shuttle assembly of the second embodiment of the self-locking telescope actuator.

Referring to FIGS. 4 and 5, a second embodiment of a self-locking telescope actuator is illustrated wherein like elements to the first embodiment have like identifying numerals except with the addition of a prime symbol suffix. A self-locking telescope actuator 22' may include a shuttle assembly 46' that may be directly engaged to an end of an axially translating screw 44' mounted to an upper jacket 28'. In this embodiment, the direct engagement does not permit the screw 44' to rotate about centerline 59'. A casing 56' may be rigidly mounted to the lower jacket 24' along with a drive means 48'. The drive means 48' may include an electric motor 80 that drives a worm 82. A nut 50' mounted for rotation in the casing 56' may include an outer circumferential surface 84 that may define geared teeth. The worm 82 may be geared to the teeth thus rotating the nut 50' within the casing 56'. Rotation of the non-translating nut 50' causes the screw 44' to translate along centerline 59' and carry the shuttle assembly 46' and upper jacket 28' with it. Similar to the first embodiment, springs 54', bearings 52' and stops 68', 70' are configured within the casing 56'.

In operation of the self-locking telescope actuator 22', the worm 82 drives the gear portion of the nut 50'. The rotation of the nut 50' propels the screw 44' (i.e., moves or translates the screw axially). During the manual mode, the worm 82 may not be connected to the motor 80 of the drive means 48'. The driver may apply a force to the steering column with the steering wheel. This force may cause the screw 44' to overhaul (i.e., back-drive) the nut and back-drive the worm 82. The axial force on the nut 50' is not sufficient to compress either spring 54'.

In operation, and regardless of whether the self-locking telescope actuator 22' is in the power or manual states, the nut does not backspin upon the screw 44'. Any axial loads applied to the steering wheel of the steering column (i.e., an E/A event), may apply a force into the screw 44' that compresses the spring 54'. This may enable the nut 50' (i.e. helical gear) to translate in the casing 56'. This axial translation of the nut 50' causes the engagement of the stops 68', 70', which prevents rotation of the nut. Because the screw 44' is rotationally fixed, and the nut within this scenario is now rotationally fixed, the actuator 22' is locked in an axial position. This axially locked condition holds the shuttle assembly 46' stationary causing the shearing of the attachment between the shuttle assembly and the upper jacket 28'. Any subsequent axial motion between the shuttle assembly 46' and the upper jacket 28' will deform the E/A device 29'.

In-other-words and during an E/A event, the forces applied to the screw 44' are sufficient to compress one of the springs 54' and allow the nut 50' to engage the casing 56'. This engagement at the stops 68', 70' prevents translation of the screw 44'. When this is accomplished, the shuttle assembly 46' may shear from the upper jacket 28' and deform the E/A device 29'. This deformation of the E/A device 29' provides controlled axial motion between the now stationary shuttle assembly 46' and the mobile upper jacket 28'.

Figure 6:
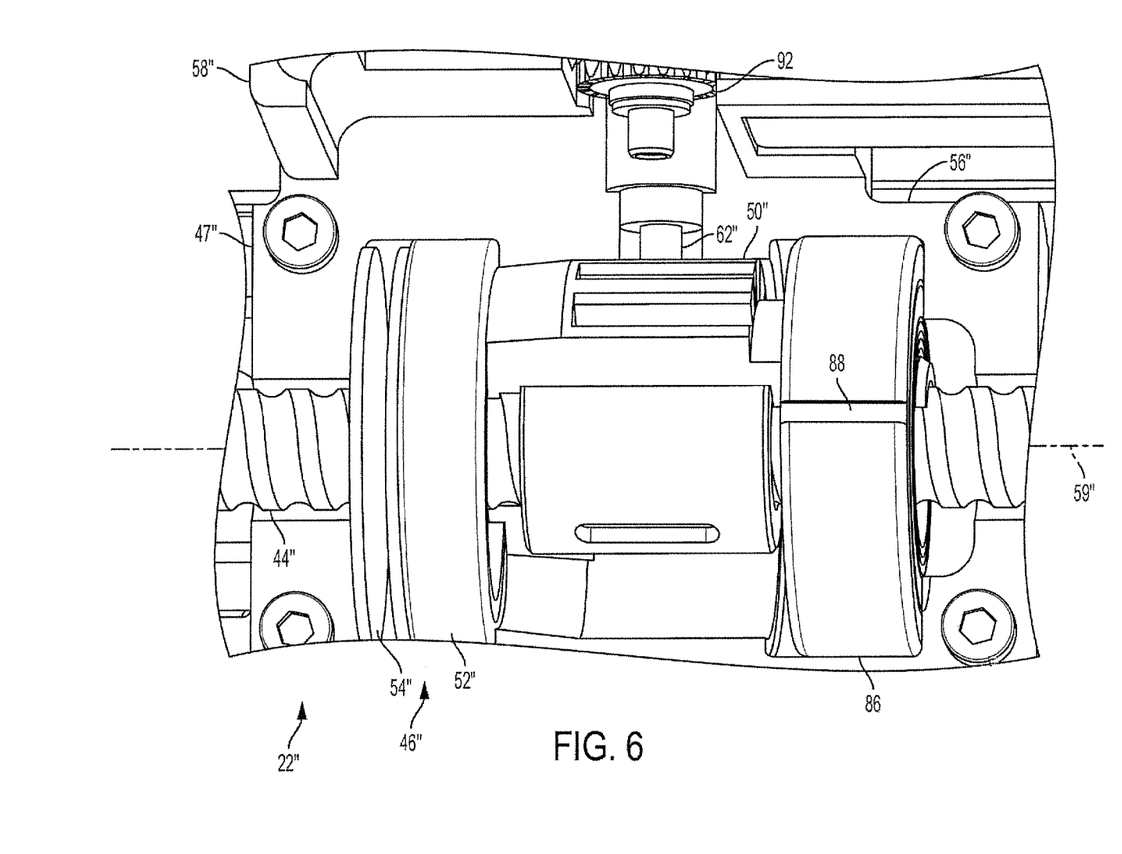
FIG. 6 is a perspective view of a third embodiment of a shuttle assembly with portions removed to show internal detail.
Figure 7:
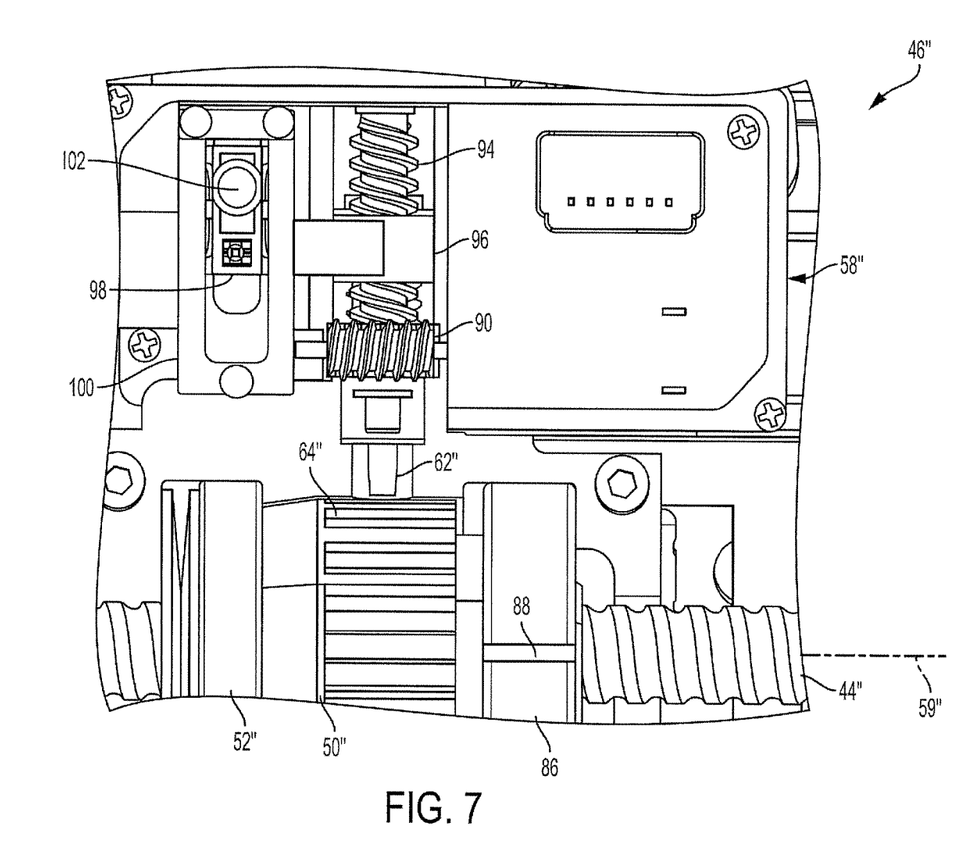
FIG. 7 is another perspective view of the third embodiment of the shuttle assembly with portions removed to show internal detail.

Referring to FIGS. 6 and 7, a third embodiment of a self-locking telescope actuator is illustrated wherein like elements to the first and/or second embodiments have like identifying numerals except with the addition of a double prime symbol suffix. A self-locking telescope actuator 22" includes a shuttle assembly 46" that may include a shuttle 47" and a clutch device 58" that may be directly supported by and engaged to the shuttle 47".

The shuttle assembly 46" may further include a nut 50", a bearing 52", a resilient member 54" (e.g., a coiled spring or a disc spring), a casing 56", and a clutch bearing 86 that generally replaces one of the bearings 52 of the first embodiment. The clutch bearing 86 enables the nut 50" to rotate relative to the casing 56" in one rotational direction (i.e., clockwise or counterclockwise). The clutch bearing 86 may be rotationally constrained by a keyway 88 on an outer diameter (i.e., radially outward facing surface). In a similar manner, the clutch bearing 86 may be rotationally constrained by a similar keyway (not shown) on an inner diameter. The clutch bearing 86 may rotate freely in one direction permitting the nut 50" to free-wheel upon the screw 44" thus enabling the shuttle 47" to axially translate, and with it, the rearward segment of the steering shaft (not shown), upper jacket, and hand steering wheel. In operation, and if the direction of free-wheel is attempted in reverse, the clutch bearing 86 will prevent rotation between the inner and outer races. The inability to rotate prevents the free-wheeling of the nut 50" and locks the shuttle in an axial position along the screw 44" so long as the force is applied.

Figure 8:
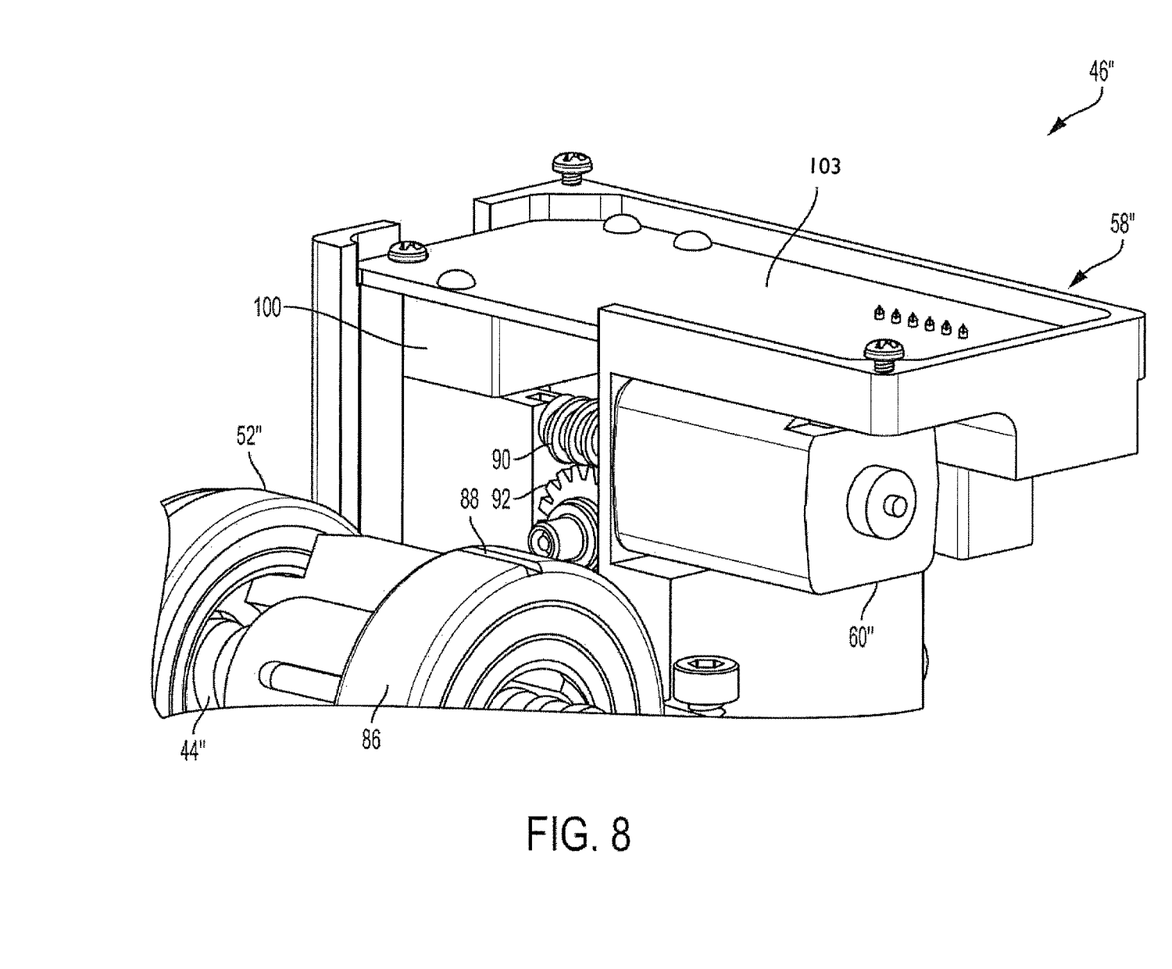
FIG. 8 is another perspective view of the third embodiment of the shuttle assembly with portions removed to show internal detail.
Figure 9:
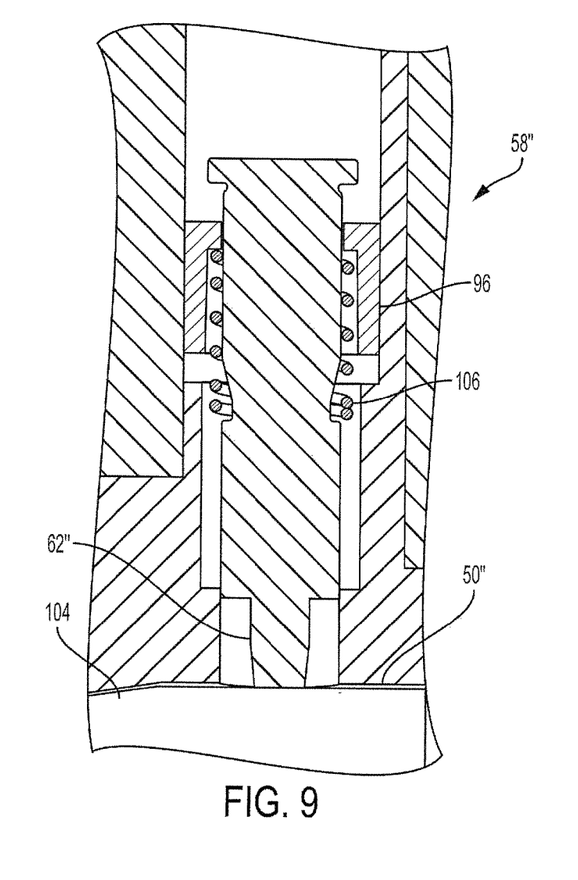
FIG. 9 is a partial cross section of a clutch device of the third embodiment of the shuttle assembly.

Referring to FIGS. 7 and 8, a servo 60" of the clutch device 58" may drive a crossed-axis, helical, gear set that includes a drive gear 90 and a driven gear 92. The driven gear 92 may be coupled to a screw 94 of the clutch device 58" (see FIG. 8) and rotates in unison with the drive gear 90. In turn, a carrier 96 of the clutch device 58" (see FIGS. 7 and 9), is connected through the threads of the screw 94 so as to translate when the screw 94 rotates.

Referring to FIG. 7, the carrier 96 may also move a slide 98 of the clutch device 58" and in a guide 100. The slide 98 may hold a magnet 102 that may be sensed via Hall Effect sensors as part of an interfacing circuit board, or circuitry, 103 (see FIG. 8). The sensors may allow non-contact position feedback of the locked and unlocked positions of the clutch device 58". It is contemplated and understood that other feedback devices capable of providing an absolute position, or relative position utilizing magnetic or other sensing technologies may be applicable.

Referring to FIG. 7, the clutch device 58" is illustrated in the locked position. A bolt 62" of the clutch device 58" is engaged with grooves 64" in the surface of the nut 50". If the groove 64" is not aligned to receive the bolt 62" when the shuttle assembly 46" attempt to move into the locked position (i.e., the servo 60" attempts to move the carrier 96 and the bolt 62"), the bolt 62" will rest on top of a nut tooth 104 (see FIG. 9). The servo 60" may complete the motion to the locked position and will compress a bolt spring 106. When the nut 50" rotates, the bolt spring 106 may load the bolt 62" into the groove 64", thus preventing the nut 50" from rotating.

In operation, rotation of the screw 44" may only be accomplished when a motor is running (not shown, but see drive means 48 in the self-locking telescope actuator 22, FIG. 1). If the nut 50" is locked (i.e., bolt 62" is engaged with the peripheral grooves or slot 64"), rotation of the screw 44" via the motor, when in the powered state, may cause the nut 50" to move the shuttle assembly 46" axially, and with it, the upper jacket. Any manual forces applied to the steering column when in the powered state may not result in steering column motion.

If the nut 50" is not locked (i.e., bolt 62" is not engaged with the peripheral groove 64") then the back spinning of the nut 50" facilitates the manual, axial, movement of the steering wheel, upper jacket, shuttle assembly 46", and nut 50" along the screw 44". This manual movement is generally the manual state, and manual forces applied to the steering column when in the manual state may result in steering column motion. The clutch bearing 86 may limit the direction of motion allowed when in the manual state.

Benefits and advantages of the present disclosure may include a telescope actuator capable of being uncoupled during application of an E/A event via a self-locking feature. Loads may therefore be applied to the E/A strap to absorb energy form, for example, the driver.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. An extendable steering column assembly comprising:
   a steering shaft configured to rotate about an axis, the steering shaft including a forward shaft portion mounted for rotation to a support structure, and a rearward shaft portion mounted for rotation to a jacket, the rearward shaft portion being configured to axially translate with the jacket and with respect to the support structure and the forward shaft portion;
   an energy absorption device engaged to the jacket; and
   a telescope actuator including a screw engaged to the support structure and extending along a centerline, and a shuttle assembly engaged between the energy absorption device and the screw, at least a portion of the shuttle assembly being configured to translate axially along the centerline with the energy absorption device, the rearward shaft portion, and the jacket when in a power state and when in a manual state, and at least the portion of the shuttle assembly being configured to prevent translation when in an energy absorption state.

2. An extendable steering column assembly comprising:
   a steering shaft configured to rotate about an axis, the steering shaft including a forward shaft portion mounted for rotation to a support structure, and a rearward shaft portion mounted for rotation to a jacket, the rearward shaft portion being configured to axially translate with the jacket and with respect to the support structure and the forward shaft portion;
   an energy absorption device engaged to the jacket; and
   a telescope actuator including a screw engaged to the support structure and extending along a centerline, and a shuttle assembly engaged between the energy absorption device and the screw, at least a portion of the shuttle assembly being configured to translate axially along the centerline with the energy absorption device, the rearward shaft portion, and the jacket when in a power state and when in a manual state, and at least the portion of the shuttle assembly being configured to prevent translation when in an energy absorption state, wherein the shuttle assembly includes a nut operably threaded to the screw for translating motion between the screw and the nut along the centerline when in the power and manual states.

3. The extendable steering column assembly set forth in claim 2, wherein the shuttle assembly includes a casing operably engaged to the nut.

4. The extendable steering column assembly set forth in claim 3, wherein the shuttle assembly includes a bearing operably disposed between the casing and the nut.

5. The extendable steering column assembly set forth in claim 4, wherein the bearing is a clutch bearing.

6. The extendable steering column assembly set forth in claim 4, wherein the shuttle assembly includes a resilient member disposed axially between the bearing and the casing.

7. The extendable steering column assembly set forth in claim 4, wherein the casing is a shuttle, and the shuttle assembly includes a clutch device engaged to the shuttle and constructed and arranged to lock the shuttle to the nut when in the energy absorption state.

8. The extendable steering column assembly set forth in claim 7, wherein the clutch device includes a bolt disposed in a groove in the nut to facilitate locking the shuttle to the nut.

9. The extendable steering column assembly set forth in claim 3, wherein the casing is a shuttle, and the telescope actuator includes a drive means supported by the support structure, and constructed and arranged to rotate the screw when in the power state.

10. The extendable steering column assembly set forth in claim 3, wherein the telescope actuator includes a drive means supported by the support structure, and constructed and arranged to rotate the nut to effectuate axial translation of the screw with respect to the nut and along the centerline.

11. An extendable steering column assembly comprising:
    a support structure;
    a jacket configured to axially translate along an axis;
    a steering shaft configured to rotate about the axis, the steering shaft including a forward shaft portion mounted for rotation to the support structure, and a rearward shaft portion mounted for rotation to the jacket, wherein the rearward shaft portion is configured to axially translate with the jacket;
    an energy absorption device engaged to the jacket and configured to absorb energy directed in an axial direction when in an energy absorption state; and
    a telescope actuator including:
       a casing, wherein the energy absorption device is engaged to and extends between the casing and the jacket;
       a threaded rod mounted to the support structure;
       an electric motor constructed and arranged to induce motion between the threaded rod and the casing when in a power state; and
       a nut disposed at least in-part in the casing and operably threaded to the threaded rod, wherein the casing is constructed and arranged to translate axially with respect to the threaded rod when in the power state and when in a manual state, and wherein the rearward shaft portion and the jacket are constructed and arranged to translate axially with respect to the support structure when in the power and manual states, and one of the nut and the threaded screw is constructed and arranged to back-spin upon and with respect to the other of the nut and the threaded screw when in the manual state, and axially translate and rotate with respect to the other of the nut and threaded rod when in the power state.

12. The extendable steering column assembly set forth in claim 11, wherein the extendable steering column assembly is configured to extend and retract along an axis when in the power and manual states, and retract at least in-part when in the energy absorption state.

13. The extendable steering column assembly set forth in claim 12, wherein the casing is a shuttle, and the shuttle is constructed and arranged to not translate axially with respect to the threaded rod when in the energy absorption state, and wherein the nut is constructed and arranged to lock to the casing when in the energy absorption state.

14. The extendable steering column assembly set forth in claim 13, wherein the electric motor is constructed and arranged to rotate the threaded rod for translation of the shuttle.

15. The extendable steering column assembly set forth in claim 14, wherein the telescope actuator includes a clutch device supported by the shuttle and configured to disengage the nut from the shuttle when in the manual state.

16. The extendable steering column assembly set forth in claim 12, wherein the telescope actuator includes a resilient member disposed axially between the casing and the nut for compression when in the energy absorption state.

17. The extendable steering column assembly set forth in claim 16, wherein the telescope actuator includes a bearing disposed between the casing and the nut.

18. The extendable steering column assembly set forth in claim 17, wherein the telescope actuator includes a locking stop carried between the casing and the nut for locking the nut when in the energy absorption state.

19. The extendable steering column assembly set forth in claim 18, wherein the locking stop includes a conical inward face carried by the shuttle and a conical outward surface carried by the nut.

20. The extendable steering column assembly set forth in claim 18, wherein the telescope actuator includes a gear engaged to the nut and driven by the electric motor for axially translating the threaded rod when in the power state.

* * * * *